Aug. 4, 1953  J. VACKAŘ  2,648,048
WATTMETER FOR ELECTRIC HIGH-FREQUENCY CURRENTS
Filed Sept. 14, 1948
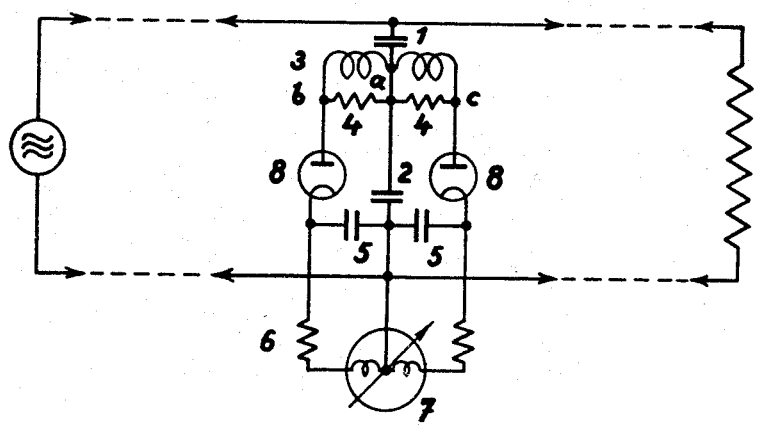
INVENTOR
Jiří Vackář
BY Patented Aug. 4, 1953

2,648,048

UNITED STATES PATENT OFFICE 2,648,048

WATTMETER FOR ELECTRIC HIGH-FREQUENCY CURRENTS

Jiří Vackář, Prague, Czechoslovakia, assignor of one-half to Tesla, National Corporation, Prague, Czechoslovakia Application September 14, 1948, Serial No. 49,251
In Czechoslovakia September 23, 1947

1 Claim. (Cl. 324—119)

This invention relates to the measurement of high frequency electric power and, more particularly, to a simple, inexpensive and highly accurate wattmeter for such high frequency measurements.

Known methods and apparatus used for the measurement of power at high frequencies, for example, to measure the power output of a high frequency radio broadcasting station, generally do not provide reliable results. A reliable method of measurement of high frequency power is the calorimetric method, but this method is inadequate, in practice, as it measures only the power actually used in the measuring calorimeter, and not the entire power output.

It has been proposed to use wattmeters incorporating electronic valves, particularly valves or tubes having quadratic characteristics, as set forth, for example, in U. S. Patent No. 1,536,553. Such arrangements have not been successful in practice due to the delicate adjustments required with respect to the electronic valves, and also due to the lack of adjustment stability under operating conditions. A further proposal has been the use of wattmeters incorporating a thermal element, as in British Patent No. 384,443. Such arrangements are more stable, but have a great disadvantage in the low overloading capacity.

In accordance with the present invention, the defects and disadvantages of the prior art are overcome, and a stable high frequency wattmeter with a satisfactory overload capacity is provided in a novel manner. Specifically, voltages proportional, respectively, to the sum and to the difference of the voltages and current components of the quantity to be measured are rectified in linear rectifiers, and currents, proportional to the two rectified values, are applied to an electro-magnetic measuring system or meter having a quadratic measuring characteristic. The latter has two windings acting on the same axis but in opposed directions, and one rectified quantity is applied to each winding.

For an understanding of the invention principles, reference is made to the following description of a typical embodiment thereof as illustrated in the accompanying drawing. In the drawing, the single figure is a schematic wiring diagram of a wattmeter embodying the invention.

In the wattmeter shown in the drawing, a condenser type voltage divider comprising the serially connected condensers 1 and 2 is connected across the line, and a symmetrical current transformer 3 has its mid-point connected to point $a$ of the voltage divider. Each of the two symmetrical halves of the winding of transformer 3 is shunted by a non-inductive or ohmic resistance 4. These components form the indicating system. At the point $a$ of the condenser divider, there is a voltage to ground of a value and phase proportional to the total voltage on the line. Voltages are produced across the resistances 4, the values and phases of which are proportional to the current in the line. At the terminal points of the resistances 4, i. e. at the points $b$ and $c$ voltages are produced, of which one is the sum of the voltage and current component and the other is their difference. These voltages are rectified linearly by the diodes 8, the cathodes of which are connected to ground through the condensers 5, the working resistances 6 and the winding of the special measuring instrument 7. This instrument consists of two electromagnetic torque producing systems having a quadratic measuring characteristic commonly used for the measurement of alternating currents, the torques being exerted on a common axis in such a way that they act against each other. Each electromagnetic system is fed from one single valve 8. The resulting deflection of the instrument depends on the difference of the torques which, in turn, depend on the square of the current, as is usually the case in electromagnetic instruments. Since, as is known from the theory of such wiring connections, the difference of the squares of the sum and the difference of the voltage and current component is directly proportional to the power, this instrument may be calibrated directly in units of power.

This relation will be clear from the following mathematical exposition.

If the line voltage is E and the line current I, then $$I = I_0 \sin \omega t$$
$$E = E_0 \sin (\omega t + \phi)$$

The voltages at the points $b$ and $c$ will be $$E_b = k_1 E_0 \sin (\omega t + \phi) + k_2 I_0 \sin \omega t$$
$$E_c = k_1 E_0 \sin (\omega t + \phi) - k_2 I_0 \sin \omega t$$

and the rectified voltage on the cathodes of the diodes will be equal to the peak value $E_b$ and $E_c$. Provided that, e. g.

$$k_2 I_0 \sin \omega t \gg k_1 E_0 \sin (\omega t + \phi)$$

(only to simplify the calculation, the measurement is correct even without this provision) the rectified voltages are $$E_1 = k_2 I_0 + k_1 E_0 \cos \phi, \quad E_2 = k_2 I_0 - k_1 E_0 \cos \phi$$

and the deflection of the instrument is proportional to the difference of the squares $$= k_3(E_1^2 - E_2^2) = k_3 \times 4k_1k_2I_0E_0 \cos \phi$$

Hence it is proportional to the transmitted power.

In the practical design of the wattmeter, it is necessary to assume that the frequency range is limited, on the high side, by the fact that the stray and internal capacities of diode valves 8 act in parallel with the resistances 4 for the current component and in series therewith for the voltage component. Although phase errors are compensated out in this way, the amplitude errors, however, add together, so that the highest practical frequency is given approximately by the expression $$f \doteq \frac{1}{24RC}$$

where R is the value of the resistances 8 and C the value of the stray capacity. Similarly, the lowest practical frequency is determined by the fact that the diode load is connected in parallel with the condenser 2 and that the resistance 4 is placed into the current transformer 3. The phase errors caused by these two sources may be again compensated out, if we satisfy the condition $$4L_3 = C_2R_4R_6$$

where $L_3$ is the inductance of the current transformer 3 and the values $C_2R_4R_6$ are the capacity and resistances of the corresponding components 2, 4, 6. The lowest practical frequency will then be given by the expression $$f \doteq \frac{R_4}{24L_3}$$

It should be noted that the coupling capacity 1 may be incorporated with current transformer 3, which is especially convenient for measurement of high power with voltages of the order of several kv. Also, the wattmeter may be adapted for other power measurements, such as on symmetric or polyphase lines, by using a current transformer on each branch and adding the resultant torques in a single instrument or in several instruments.

While a specific embodiment of the invention has been shown and described in detail to illustrate the application of the principles thereto, it should be understood that the invention may be otherwise embodied without departing from such principles.

I claim:

A wattmeter for high frequency power measurements comprising, in combination, a capacity voltage divided connected across the line to be measured; a symmetrical current transformer having its mid-point connected to the mid-point of said voltage divider and having equal winding sections arranged on each side of said voltage divider to derive from the line a pair of voltages in substantially phase opposition to each other; said divider including a condenser coupling said transformer to the line; a pair of resistive shunts each connected across a winding section, each of said shunts being connected to the mid-point of said voltage divider; a pair of linear electronic valve rectifiers each in circuit with a winding section and operable to rectify the voltage thereacross; an indicator including torque producing means responsive to the squares of the currents derived from said rectifiers; and a resistance-capacity network for applying the rectified voltages to said torque producing means; the inductance ($L_3$) of each winding section, the capacity ($C_2$) of the coupling condenser of the voltage divider, the resistance ($R_4$) of each resistive shunt, and the resistance ($R_6$) of each network resistance having a relation expressed as follows:

$$4L_3 = C_2R_4R_6$$

JIŘÍ VACKÁŘ.

References Cited in the file of this patent

UNITED STATES PATENTS

| Number | Name | Date |
|---|---|---|
| 2,416,977 | Brown et al. | Mar. 4, 1947 |
| 2,423,416 | Sontheimer et al. | July 1, 1947 |
| 2,443,097 | Crosby | June 8, 1948 |

FOREIGN PATENTS

| Number | Country | Date |
|---|---|---|
| 511,367 | Great Britain | Aug. 17, 1939 |